(12) United States Patent
Kloeker et al.

(10) Patent No.: US 9,742,315 B2
(45) Date of Patent: Aug. 22, 2017

(54) HANDHELD WORK APPARATUS HAVING A DRIVE CIRCUIT FOR AN ELECTRIC MOTOR WHICH DRIVES OSCILLATING TOOLS

(71) Applicant: Andreas Stihl AG & Co. KG, Waiblingen (DE)

(72) Inventors: Jens Kloeker, Waiblingen-Bittenfeld (DE); Jochen Luz, Waiblingen-Hohenacker (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 32 days.

(21) Appl. No.: 14/025,729

(22) Filed: Sep. 12, 2013

(65) Prior Publication Data

US 2014/0070737 A1    Mar. 13, 2014

(30) Foreign Application Priority Data

Sep. 12, 2012 (DE) ..................... 10 2012 017 963

(51) Int. Cl.

| H02P 1/54 | (2006.01) |
|---|---|
| H02P 1/22 | (2006.01) |
| B25F 5/00 | (2006.01) |
| A01D 46/26 | (2006.01) |
| A01G 3/053 | (2006.01) |
| H02P 6/22 | (2006.01) |

(52) U.S. Cl.
CPC ............. *H02P 1/22* (2013.01); *A01D 46/264* (2013.01); *B25F 5/00* (2013.01); *A01D 2046/266* (2013.01); *A01G 3/053* (2013.01); *H02P 6/22* (2013.01)

(58) Field of Classification Search
CPC .... H02P 6/003; H02P 2007/0088; H02P 7/29; H02P 8/20
USPC .......................................................... 318/54
See application file for complete search history.

(56) References Cited

U.S. PATENT DOCUMENTS

| 2,416,229 A | * | 2/1947 | Shoemaker | ................... 318/281 |
| 4,609,155 A | * | 9/1986 | Garnier | ................... B02C 18/24 |
| | | | | 241/101.2 |
| 5,299,648 A | * | 4/1994 | Watanabe et al. | ............ 180/446 |
| 6,078,152 A | * | 6/2000 | Dieterle et al. | ................ 318/264 |

(Continued)

FOREIGN PATENT DOCUMENTS

| EP | 2027768 A1 | 2/2009 |
| WO | 2012010190 A1 | 1/2012 |

*Primary Examiner* — Bickey Dhakal
(74) *Attorney, Agent, or Firm* — Walter Ottesen, P.A.

(57) ABSTRACT

A handheld work apparatus having an electric motor and a drive circuit for the electric motor. The rotation movement of the motor is converted into an oscillating movement of the work tool via a gear mechanism. The motor is situated in a circuit including at least the motor and a switch for operating the motor. To reduce wear of the gear mechanism, a control unit for operating the motor in one of two directions of rotation is provided. The control unit independently determines a selected direction of rotation for a next operating cycle as a function of a control variable. When the motor is started, the motor is started by the control unit in the direction of rotation which is associated with a value of the control variable. The control variable changes before the motor is restarted for a following operating cycle.

14 Claims, 3 Drawing Sheets

(56) References Cited

U.S. PATENT DOCUMENTS

| | | | |
|---|---|---|---|
| 2005/0045354 A1* | 3/2005 | Arimura et al. | 173/219 |
| 2006/0157260 A1* | 7/2006 | Greese et al. | 173/1 |
| 2006/0265890 A1* | 11/2006 | Solan et al. | 33/320 |
| 2009/0188361 A1* | 7/2009 | Simpson | A01G 3/053 83/367 |
| 2010/0300163 A1* | 12/2010 | Loughlin | E05B 37/08 70/301 |
| 2011/0114346 A1* | 5/2011 | Suzuki | B25B 21/02 173/2 |

* cited by examiner

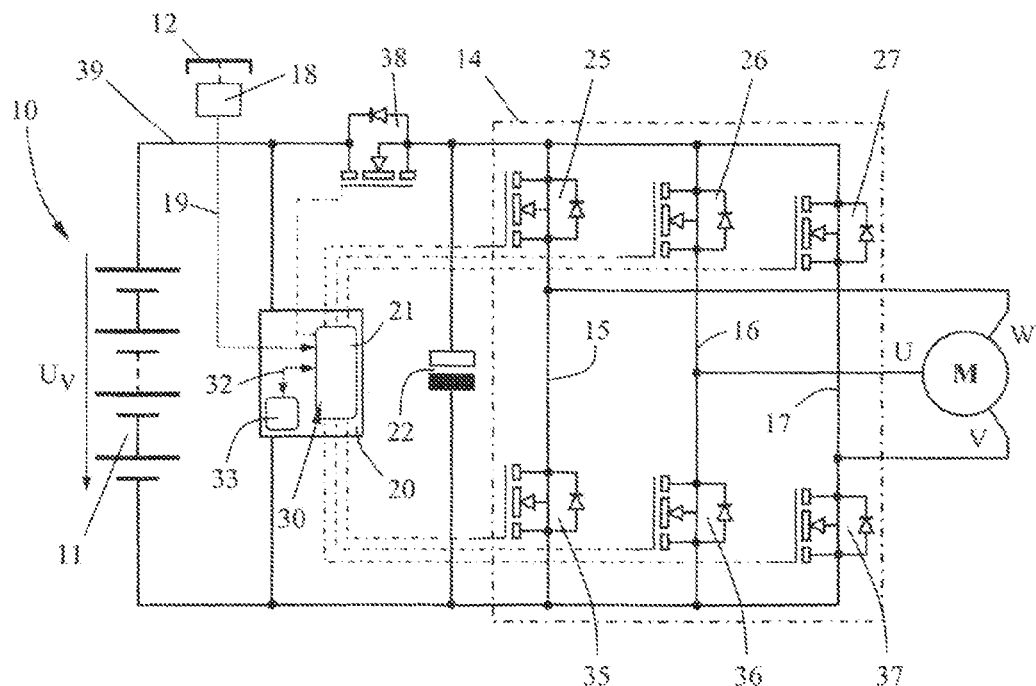
FIG. 3
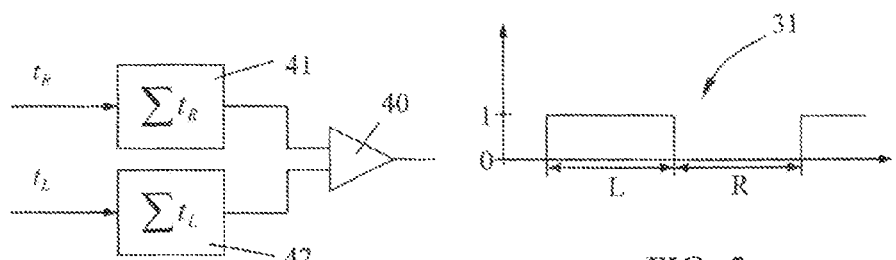
FIG. 4
FIG. 5
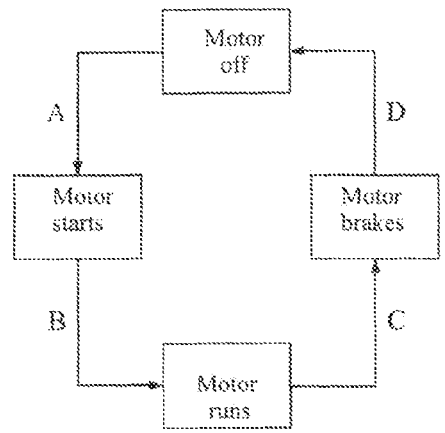
FIG. 6

HANDHELD WORK APPARATUS HAVING A DRIVE CIRCUIT FOR AN ELECTRIC MOTOR WHICH DRIVES OSCILLATING TOOLS

CROSS REFERENCE TO RELATED APPLICATION

This application claims priority of German patent application no. 10 2012 017 963.4, filed Sep. 12, 2012, the entire content of which is incorporated herein by reference.

BACKGROUND OF THE INVENTION

Work apparatuses of this kind, for example olive pickers, hedge trimmers or one like, have an electric motor and the rotating drive shaft of the electric motor drives a work tool in an oscillating manner via a gear mechanism. In this case, the gear mechanism converts the rotary movement into a reciprocating movement of the work tools.

The electric motor is disposed in a circuit which includes at least the electric motor and a switch via which the electric motor is put into operation from a supply system or a rechargeable battery pack.

It has been found that converting the rotary drive movement of the electric motor into an oscillating drive movement of the work tools subjects the gear mechanism to loading and one-sided wear. In order to prevent breakdown of the gear mechanism, it has to be correspondingly robust and designed for the preferred direction of rotation. This leads to a complex gear mechanism and therefore to a high weight, poor ergonomics and poor handling of the work apparatus.

SUMMARY OF THE INVENTION

It is an object of the invention to reduce the wear on a gear mechanism which is arranged between a rotating electric motor and an oscillating work tool.

The handheld work apparatus of the invention includes: a work tool; a gear mechanism; an electric motor configured to generate a rotational movement and to drive the work tool via the gear mechanism; the gear mechanism being configured to convert the rotational movement of the electric motor into an oscillating movement of the work tool; an electric circuit including the electric motor and a switch unit for operating the electric motor in a rotational direction; the electric circuit further including a drive circuit for the electric motor; the drive circuit including a control unit configured for one operating of the electric motor in one of a first rotational direction and a second rotational direction; and, the control unit being further configured to independently determine a selected one of the rotational directions of the electric motor for a next operating cycle ($B_n$) in dependence upon a control variable and, when the electric motor is started, the electric motor is started in the rotational direction corresponding to a value of the control variable and the value of the control variable is independently newly determined for a following operating cycle ($B_{n+x}$).

A control unit for operating the electric motor in one of two directions of rotation is provided. The control unit automatically selects one of the two possible directions of rotation of the electric motor on the basis of a control variable. The value of the control variable is checked before the electric motor is started, without direct intervention by the user. Therefore, it is possible, for example, for a first value of the control variable to be associated with a first direction of rotation of the electric motor, and for a second value of the control variable to be associated with a second direction of rotation of the electric motor. If the electric motor is started, the direction of rotation of the electric motor is determined by the control unit and the electric motor is put into operation in the selected direction of rotation which corresponds to the checked value of the control variable.

Provision is made for the control variable to change value before the electric motor is restarted—in accordance with prespecified criteria—so that the control variable can have a different value when the electric motor is restarted in a following operating cycle. If the control variable has another value, an inverted direction of rotation is prespecified by the control unit and the electric motor is put into operation in the other direction of rotation. This has the result that the direction of rotation of the electric motor is repeatedly automatically changed to the successive operating cycles of the electric motor over a relatively long operating time of the work apparatus, with the result that the gear mechanism is not subjected to loading only in one direction of rotation but rather is subjected to loading in both directions of rotation. Repeatedly switching the direction of the electric motor which drives the work tool leads to more uniform wear of the gear mechanism, as a result of which the gear mechanism itself has relatively longer service times overall, given the same structural configuration. This also provides the option of using a gear mechanism of simple design which is made of preferably lightweight material, with the result that handling and ergonomics of the work apparatus are improved due to a saving in weight.

Reversing the direction of rotation of the electric motor does not change the oscillating movement (back-and-forth movement, wiper movement, translatory movement and the like) of the work tool itself. In this respect, reversing the direction of rotation does not give rise to any disadvantages when working with the oscillating work tools of the work apparatus.

Provision is preferably made for the control variable to change value in a time window after the electric motor is started and before the electric motor is next restarted. In this case, provision is made, in particular, for the control variable to change between two prespecified values, wherein a first value is associated with a first direction of rotation of the electric motor (for example clockwise rotation), and a second value is associated with a second direction of rotation of the electric motor (for example counterclockwise rotation). The control variable advantageously changes, for example, between the values "0" and "1" in accordance with the binary coding of commercially available memories.

In a particular embodiment of the invention, provision is made for the control variable to periodically change value from one operating cycle to the next, that is to say the direction of rotation is inverted in each case. An operating cycle with the electric motor rotating in the clockwise direction is followed by an operating cycle wish the electric motor rotating in the counterclockwise direction, this again being followed by an operating cycle wish the electric motor rotating in the clockwise direction etc.

In a simple embodiment, the control variable can change value randomly. This can be implemented by a simple random number generator which can be integrated, for example, in the drive circuit. A simple random number generator can be a counter which counts with a fixed or variable clock frequency during operation of the electric motor; the electric motor being started in the clockwise direction given an even-numbered counter reading, and the electric motor being started in the counterclockwise direction given odd numbers. Random reversal of the direction of rotation of the driving electric motor already leads to more uniform wear of the year mechanism.

A signal which is used to change the value of the control variable can advantageously already be derived from the mechanical operation of the operating switch. If the control variable changes each time the operating switch is actuated or the electric motor is switched on, this results in a periodic change in the direction of rotation of the electric motor.

In a preferred embodiment of the invention, provision is made for the value of the control variable to change as a function of a comparison of the run time of the electric motor in one direction of rotation and the run time of the electric motor in the other direction of rotation. This ensures that the motor is always started in the direction of rotation which has the shorter run time.

It can also be practical to change the value of the control variable as a function of a comparison of the power which is consumed by the electric motor in one direction of rotation and the power which is consumed by the electric motor in the other direction of rotation. The motor is started in the direction of rotation which has the lower totaled consumed power. The totaled electrical powers in a direction of rotation correspond approximately to the work performed in that direction of rotation.

Provision is expediently made for the value of the control variable to be stored in a memory of the drive circuit. The memory can be, for example, an EPROM memory module or else can be in the form of an EEPROM, FRAM, DRAM or in the form of a bistable or monostable flip-flop.

The control unit is advantageously provided with a microprocessor. The memory can be formed in the microprocessor. This memory can be a volatile memory, wherein provision is made for the electric motor to be started in an impressed, prespecified direction of rotation when the memory is deleted and/or when one memory content is undefined. The electric motor therefore always runs in the same direction of rotation, for example in the clockwise direction, when the memory is deleted and/or when the memory content is undefined.

A rechargeable battery pack which is accommodated in the housing of the work apparatus is advantageously provided as the energy scarce fox operating the electric motor.

BRIEF DESCRIPTION OF THE DRAWINGS

The invention will now be described with reference to the drawings wherein:

FIG. 3 shows a schematic of a drive circuit for an electronically commutated electric motor;
FIG. 4 shows a schematic of a comparison circuit for evaluating the run times in one and the other direction of rotation of the electric motor;
FIG. 5 shows an output signal from the comparison circuit of FIG. 4;
FIG. 6 is a flowchart for operating the electric motor.

DESCRIPTION OF THE PREFERRED
EMBODIMENTS OF THE INVENTION

Figure 1:
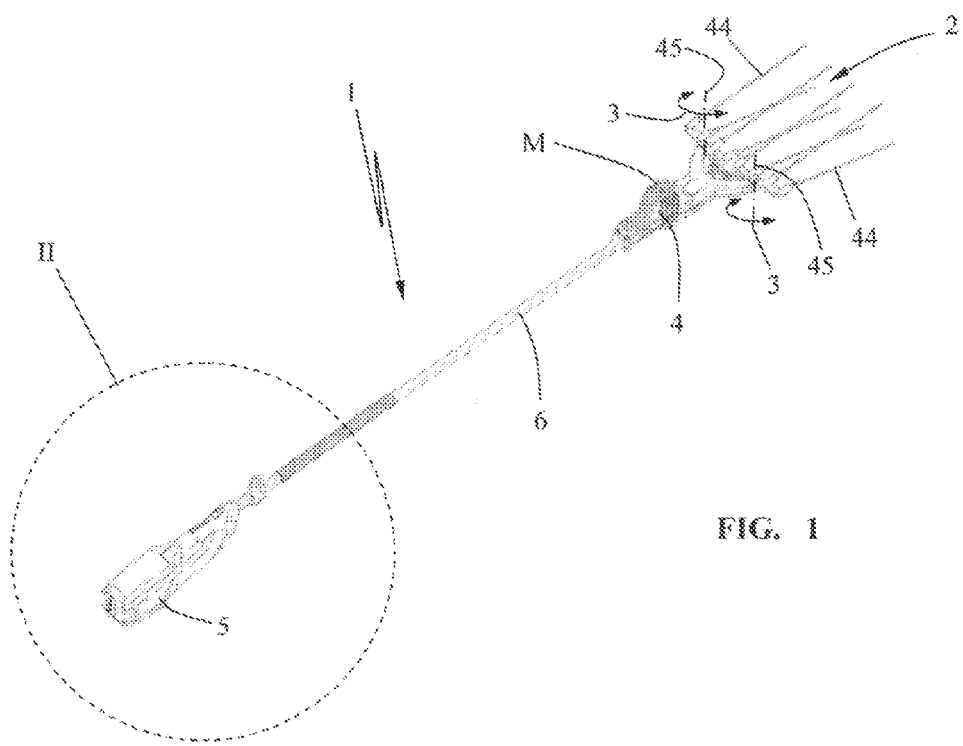
FIG. 1 is a perspective view of a harvesting tool.

The handheld work apparatus 1 shown in FIG. 1 is a harvesting apparatus with a work tool 2, for example a rake, which is moved in an oscillating manner and moves about its articulation axes 45 in the direction of the double-headed arrow 3. The oscillating work tools 2 lead to wiper movements about the axes 45. The tool movement is generated via a gear mechanism 4 which converts the rotation movement of an electric motor M, which is arranged in the gear mechanism housing, into an oscillating movement of the work tool 2. The gear mechanism 4 with the electric motor is provided on one end of a guide rod 6 of the work apparatus 1. A housing 5 having an energy source, in the exemplary embodiment a rechargeable battery pack 11, is provided at the other end of the guide rod 6. The rechargeable battery pack 11 can be accommodated in a shaft in the housing 5 as a replaceable rechargeable battery pack 11 or else include individual cells which are fixed in the housing 5.

The user holds and controls the work apparatus 1 via a handle 7, which is formed on the housing 5, and a handle region 8 on the guide rod 6. It may be practical to attach the work apparatus 1 to a carrying strap, a carrying boom or the like via a loop 9 which is attached to the guide rod 6.

Figure 2:
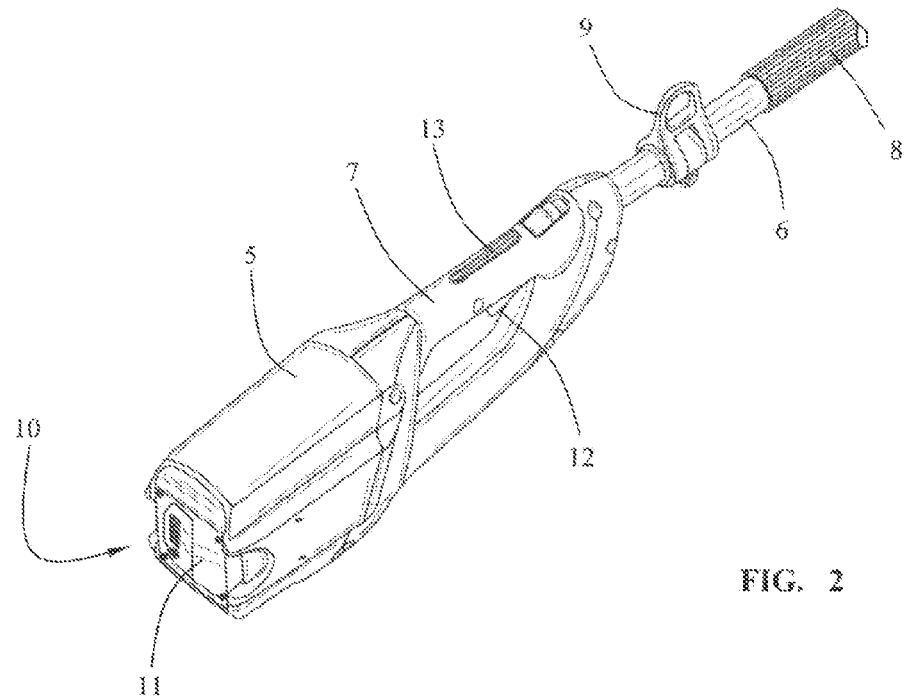
FIG. 2 is an enlarged view of detail II in FIG. 1.

In the shown embodiment according to FIG. 1, the energy source 10 for the electric motor M (FIG. 3), in the exemplary embodiment the rechargeable battery pack 11, is inserted into the housing 5. The rechargeable battery pack—as shown in FIG. 2 in particular—is substantially completely accommodated in the housing 5 of the work apparatus 1.

An operating switch 18 (FIG. 3) is arranged in the handle 7, it being possible for said operating switch to be in the form of a potentiometer, microswitch or the like. The operating switch 18 (FIG. 3) can be operated via a throttle-like operator-controlled element 12. The operator-controlled element 12 is secured via an actuating lock 13, it being possible for the operator-controlled element 12 and the operating switch 18, which is provided in the handle 7, to be operated after the actuating lock 13 is depressed.

In FIG. 3, driving of the electric motor M is illustrated using the example of an electronically commutated motor (EC motor) with a drive bridge 14. As an alternative, a brush-operated direct-current motor (DC motor) with correspondingly simplified driving, for example with an H-bridge for reversing the direction of rotation, can also be used.

In the embodiment shown, the electronically commutated electric motor M is driven in a pulsewidth-modulated manner (PWM) by a drive bridge 14. The drive bridge 14 is substantially made of three parallel branches 15, 16 and 17. Each of the parallel branches have two electronic switches (25, 35; 26, 36; 27, 37) which are connected in series. The voltage tap for the phases U, V and W of the electronically commutated electric motor M (EC motor) is provided between the electronic switches (25, 35; 26, 36; 27, 3).

The electronic switches 25, 26, 27 and 35, 36, 37 are preferably power transistors, in particular MOSFETs or similar electronic components.

The electronic switches (25, 26, 27, 35, 36, 37) of the drive bridge 14 are driven by a drive circuit 20. The drive circuit 20 includes a microprocessor 21 which operates the associated electronic swatches (25, 25, 27, 35, 36, 37) as a function of the position of the rotor of the electric motor M.

The mechanical position of the operating switch 18 and therefore the operation thereof is transmitted to the microprocessor 21 of the drive circuit 20 via a signal line 19, this being followed by the drive circuit 20 switching on a MOSFET, which is provided as a main switch 38 in the circuit 39, and connecting the supply voltage $U_V$ of the rechargeable battery pack 11 to the drive bridge 14. The drive bridge 14 is then put into operation and the electric motor M is started in a selected direction of rotation in the clockwise or in the counterclockwise direction.

The main switch 38 can also be in the form of a mechanical switch which is directly switched by the user by depressing an operator-controlled element.

Furthermore, a capacitor 22 is connected in parallel with the drive bridge 14. The capacitor preferably is an electrolytic capacitor. The capacitor 22 serves as an energy store for the system. The energy store smoothes a peak current loading on the rechargeable battery pack 11 which occurs on account of the pulsewidth-modulated drive.

The drive circuit 20 includes a control unit 30 for operating the electric motor M in a prespecified direction of rotation, that is, either so as to run counterclockwise in the direction of rotation L or so as to run clockwise in the direction of rotation R. The direction of rotation L, R of the electric motor M is selected by the control unit 30 as a function of the value of a control variable 31, as shown by way of example in FIG. 5. In the embodiment shown, the control variable 31 changes between two prespecified values, for example between the binary values "0" and "1".

A first value of the control variable 31 is associated with a first direction of rotation of the electric motor M, and a second value of the control variable 31 is associated with a second direction of rotation of the electric motor M. In the embodiment according to FIG. 5, the direction of rotation "clockwise" is associated with the first value "0", and the direction of rotation "counterclockwise" is associated with the second value "1" (FIG. 5). In the shown embodiment, provision is further made for the value "0" or "1" of the control variable 31 to be stored in a memory 33 which is preferably provided in the drive circuit 20.

If the work apparatus 1 is put into operation by a user by the operator-controlled element 12 being depressed and therefore by the operating switch 18 being switched on, operation of the operating switch 18 is signaled to the microprocessor 21 of the drive circuit 20 via the signal line 19. The microprocessor 21 switches on the main switch 38 which is configured as a MOSFET. The control unit 30, which is integrated in the microprocessor 21 in the embodiment shown, checks the value of the control variable 31, which is stored in the memory 33, via the signal line 32. If, for example, a "0" is stored, the control unit 30 will prespecify the direction "clockwise". The prespecified direction "clockwise" is implemented by the microprocessor 21 of the drive circuit 20 by the electric motor M being put into operation in the direction "clockwise" via the drive bridge 14. The work apparatus is in the operating state.

Provision is made for the control variable 31 to change value in a time window after the electric motor M is started and before the electric motor M is restarted. This can be done, for example, in such a manner that the microprocessor 21 randomly changes the value of the control variable, which value is stored in the memory 33. A corresponding random number generator can be provided in the microprocessor 21 and outputs a value which is stored in the memory 33.

If the operating switch 18 opens, the electric motor M is actively or passively stopped by the drive circuit 20. When the electric motor M is restarted, the microprocessor 21 again checks the value of the memory 33; if the value is "0", the electric motor is started in the clockwise direction of rotation; if, however, a value "1" is stored in the memory 33, the electric motor M is put into operation by the drive circuit 20 so as to rotate in the counterclockwise direction.

Figure 7:
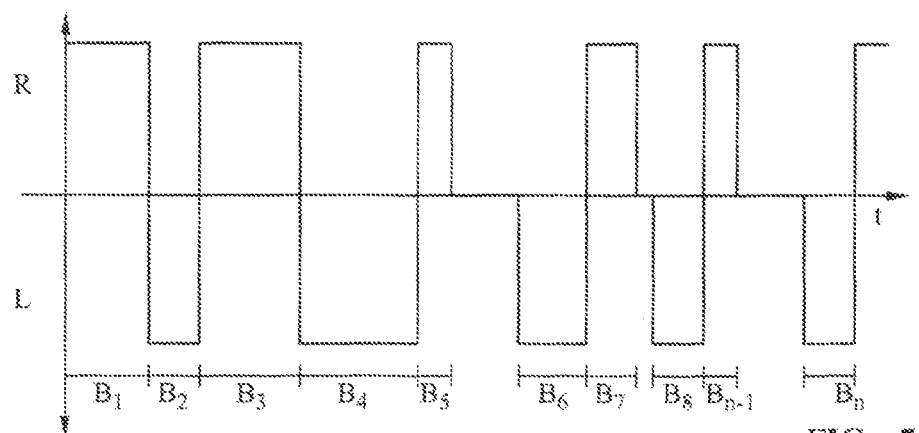
FIG. 7 is a graph of the operating cycles plotted with respect to a time axis.

This change in the operating cycles $B1, B2, \ldots, B_{n-1}, B_n$ is schematically shown in FIG. 7, wherein (n) is an arbitrary natural number. The electric motor is operated in the clockwise direction of rotation in operating cycles $B_1, B_3, B_5, B_7$ and $B_{2n+1}$; the electric motor is operated in the counterclockwise direction of rotation in the operating cycles $B_2$, $B_4, B_6, B_8$ and $B_{2n}$. In accordance with FIG. 7, the direction of rotation is inverted, that is, the direction of rotation L and R is periodically changed, after each stoppage of the electric motor M.

Figure 8:
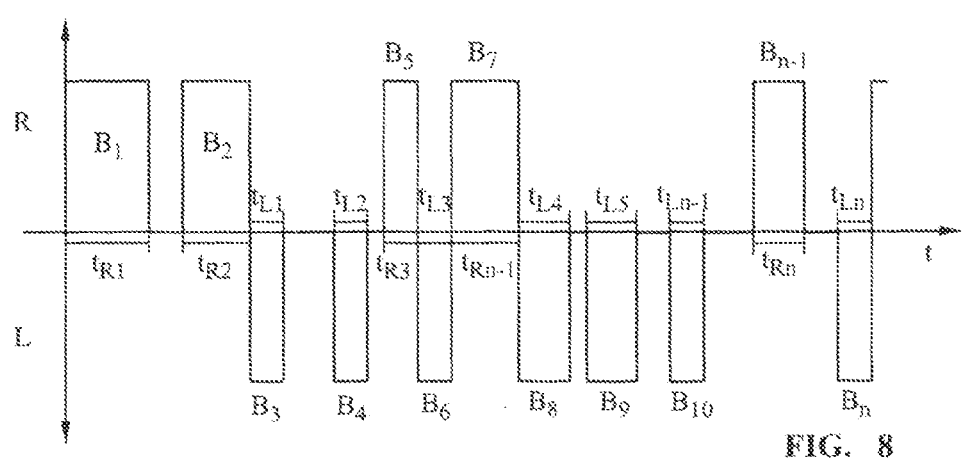
FIG. 8 is a graph of the operating times plotted with respect to a time axis; and,
FIG. 9 shows a perspective view of a further work apparatus using the example of a hedge trimmer.

In FIG. 8, the operating cycles do not change with each stoppage of the electric motor M, but rather in accordance with other—also random—criteria. In general, after a first operating cycle $B_n$, the direction of rotation changes in the following operating cycle $B_{n+x}$, where (x) can be an arbitrary natural number. Therefore, the direction of rotation can be reversed only after the second or third operating cycle $B_{n+2}$ or $B_{n+3}$, as shown in FIG. 7.

A random, repeated change in the direction of rotation of the electric motor M of the work apparatus already leads to a more uniform loading on the gear mechanism 4 which converts the rotation movement into an oscillating movement of the work tools 2. As a result, the service life of the gear mechanist 4 can be significantly increased, with the structure otherwise remaining unchanged.

The value of the control variable 31 is checked at the latest shortly before the electric motor M is started. As shown in FIG. 6, the motor is initially off or in the standby state. Proceeding in the direction of arrow A, the electric motor is then started, that is, put into operation in one or the other direction of rotation by the control unit 30 as a function of the value of the control variable 31. The motor runs (arrow B). The electric motor M can be actively or passively brought to a stop via the drive circuit 20 (arrow C); the electric motor is stationary and has assumed its initial state of "motor off" (arrow D). The value of the control variable 31 can be changed in the time window from the beginning of arrow B to the head of arrow A, that is, from when the electric motor M is started to when the electric motor M is restarted.

The embodiment according to FIG. 3 shows that mechanical operation of the operating switch 18 is signaled to the microprocessor 21 via the signal line 19. The value of the control variable 31 can be changed each time the operating switch 18 is operated. The microprocessor 21 can always write a new value for the control variable to the memory 33 when the operating switch 18 is switched on. When the operating switch 18 is first operated, the microprocessor 21 stores, for example, a "1" in the memory 33; when the operating switch 18 is operated again, the microprocessor 21 stores the value "0" in the memory 33. As a result, the value of the control variable changes each time the operating switch 18 is operated, with the result that, for example, when the operating switch 18 is first operated and the electric motor M is started, the direction of rotation R (clockwise) is provided. Since the value of the control variable 31 can be read out only directly when the electric motor M is started, the direction of rotation of the electric motor M cannot be reversed during operation of the work apparatus 1 when the electric motor M is running, even if the value of the control variable 31 changes. The inverted direction of rotation L (counterclockwise) is implemented only when the operating switch 18 is operated for a second time and the electric motor M is started for the second time. When the operating switch 18 is operated for a third time in order to start the electric motor M, the electric motor again rotates in the clockwise direction. The direction of the electric motor M is changed over in a periodic and in each case inverted manner in the immediately successive operating cycles $B_1$, $B_2$, $B_3$, ..., $B_{n-1}$, $B_n$, as shown in FIG. 7. The electric motor starts in a different, inverted direction of rotation R or L in each case.

In an embodiment which is illustrated in FIG. 4, the value of the control variable changes as a function of a comparison of the run times ($t_R$, $t_L$) of the electric motor M in one direction of rotation and in the other direction of rotation. The run time $t_R$ of the electric motor M, which rotates in the clockwise direction, is added up in a summing element 41. Accordingly, the run time $t_L$ of the electric motor, which rotates in the counterclockwise direction, is summed in a summing element 42. The output signals from the summing elements 41 and 42 are supplied to a comparator 40 which is configured such that either a "0" or a "1" is outputted as the output signal. If, for example, the output variable of the summing element 41 (clockwise rotation) is greater than the output variable of the summing element 42 (counterclockwise rotation), the comparator 40 outputs the value "1". In accordance with FIG. 5, the control variable 31 is therefore set to the value "1", with the result that the electric motor is put into operation so as to rotate in the counterclockwise direction when the electric motor M is started again, since the value "1" of the control variable 31 is associated with the direction of rotation "counterclockwise" in the embodiment. If the motor now rotates in the counterclockwise direction of rotation, the summing element 42 will display a larger output signal than the summing element 41 after a specific run time; the output signal from the comparator changes to "0". The control variable 31 is set to the value "0", with the result that when the electric motor M is restarted it now rotates in the clockwise direction as a function of the control variable 31.

The change in the direction of rotation achieved as a result is therefore dependent on the sums of the run times in one or the other direction of rotation (L, R). This is shown, by way of example, in FIG. 8 in which the operating cycles are shown with their times $t_{R1}$, $t_{R2}$ to $t_{Rn-1}$, $t_{Rn}$ and $t_{L1}$, $t_{L2}$ to $t_{Ln-1}$, $t_{Ln}$. The operating cycles in FIG. 8 are chosen arbitrarily, and are therefore an example of a random value of the control variable 31.

The value of the control variable 31 can also be changed on the basis of the power consumption of the electric motor M in one and in the other direction of rotation. In accordance with the illustration in FIG. 4, the consumed electrical power of the electric motor M in one direction of rotation R and the consumed electrical power of the electric motor in the other direction of rotation L are summed in the summing elements 41 and 42 and supplied to a comparator 40. If, for example, the output variable of the summing element 41 (clockwise rotation) is greater than the output variable of the summing element 42 (counterclockwise rotation), the comparator 40 changes the value of the control variable to "1"; if the output variable of the summing element 41 (clockwise rotation) is smaller than the output variable of the summing element 42 (counterclockwise rotation), the comparator 40 changes the value of the control variable to "0".

The memory 33 shown in the drive circuit 20 in FIG. 3 can be provided within the microprocessor 21, wherein the memory can be, in particular, a volatile memory, that is, that the stored value of the control variable 31 is lost when power is not supplied to the drive circuit 20. Upon restarting, the control unit 30 which is expediently integrated in the microprocessor 21 checks the value of the control variable 31; since the memory 33 is deleted or contains undefined memory content, the electric motor M starts in an impressed, prespecified direction of rotation, for example in the clockwise direction. When power is first supplied to the drive circuit 20, a prespecified value of the control variable 31 can be written to the memory 33; the memory 33 is thereby initialized. The value of the control variable 31, which value is written to the memory 33, defines the direction of rotation L or R which is to be executed when the electric motor M is first started, for example following replacement of the rechargeable battery pack 11.

The memory 33 can, for example, also be in the form of a flash memory, in the form of an EPROM memory, in the form of an EEPROM memory, in the form of an FRAM, in the form of a DRAM or the like.

In a further embodiment of the invention, provision can be made in an electronically commutated electric motor M to always change the value of one control variable 31, or the value of the control variable 31 which is stored in the memory 33, independently of the operating switch 18 being switched on and switched off when, for example, one of the operating switches (25, 26, 27, 25, 36, 37) of the drive bridge 14 is operated. Although this leads to repeated changing of the value of the control variable during operation, it produces a random value of the control variable, wherein the electric motor is operated randomly in the clockwise direction or in the counterclockwise direction over a period of relatively long use of the work apparatus, in a simple manner. The control variable will have a random value "0" or "1" each time the electric motor is restarted, the electric motor M being started in the clockwise direction or counterclockwise direction in accordance with said value. In this case, provision can be made for the value of the control variable to be changed only when a selected, specific switch (25, 26, 27, 35, 26, 37) of the drive bridge 14 is operated. One possible sequence of such operating cycles is shown in FIG. 8.

Figure 9:
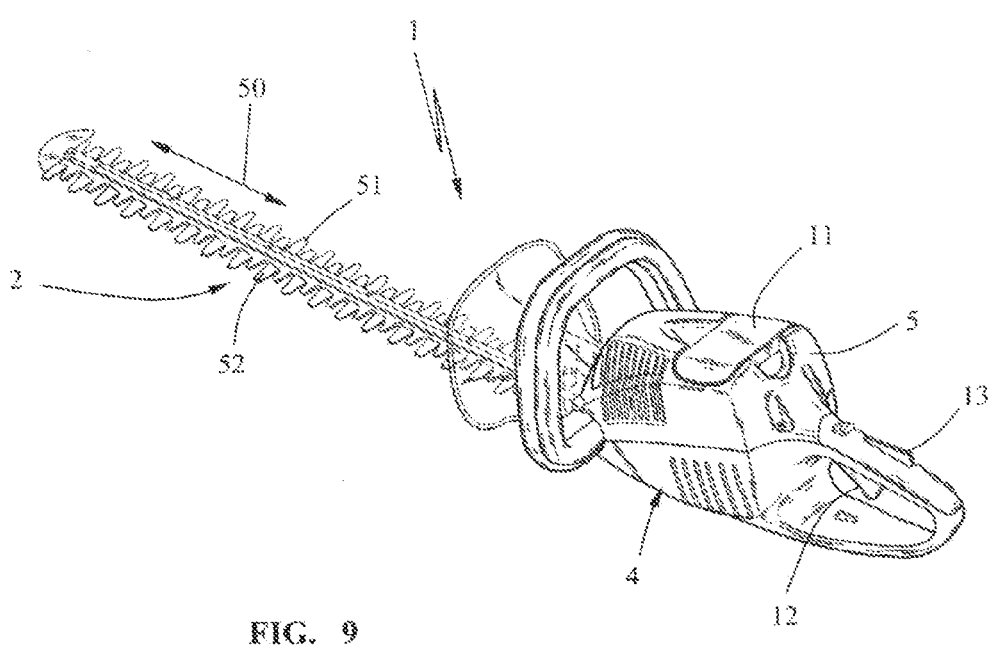

The drive circuit according so the invention is also advantageous in a work apparatus 1 according to FIG. 9 which illustrates a hedge trimmer. A rechargeable battery pack 11 is once again inserted into the housing 5 of the work apparatus 1, said rechargeable battery pack forming the energy source 10 (FIG. 3) for an electric motor M (FIG. 3) which is arranged in the housing 5. The electric motor drives a gear mechanism 4 which is arranged in the housing and which converts the rotation movement of the electric motor into a back-and-forth movement of the work tool 2, in the exemplary embodiment the blades 51 and 52 which are moved in a translatory manner in the direction of the double-headed arrow 50.

It is understood that the foregoing description is that of the preferred embodiments of the invention and that various changes and modifications may be made thereto without departing from the spirit and scope of the invention as defined in the appended claims.

What is claimed is:
1. A handheld work apparatus comprising:
a work tool;
a gear mechanism;
an electric motor configured to generate a rotational movement and to drive said work tool via said gear mechanism;
said gear mechanism being configured to convert said rotational movement of said electric motor into an oscillating movement of said work tool;

an electric circuit including said electric motor and a switch unit for operating said electric motor in a first rotational direction;

said electric circuit further including a drive circuit for said electric motor;

said drive circuit including a control unit configured for operating said electric motor in said first rotational direction or in a second rotational direction;

a memory unit configured to store a value of a control variable;

said control unit being further configured to autonomously determine a selected one of said rotational directions of said electric motor for a next operating cycle ($B_n$) in dependence upon said value of said control variable stored in said memory unit and independent of any control command of a user of said work apparatus;

when said electric motor is started, said electric motor is started in the rotational direction corresponding to the actual value of said control variable stored in said memory unit and wherein the value of said control variable is autonomously newly determined for a follow-on operating cycle ($B_{n+x}$) independent of any control command of said user;

a first summing element configured to generate a first sum associated with said electric motor being operated in said first rotational direction and to output a first output signal;

a second summing element configured to generate a second sum associated with said electric motor being operated in said second rotational direction and to output a second output signal; and, a comparator configured to compare said first output signal and said second output signal and to output a new value of said control variable.

2. The work apparatus of claim 1, wherein said value of said control variable is determined anew in a time period after the start of said electric motor and before the next restart of said electric motor.

3. The work apparatus of claim 1, wherein said value of said control variable switches between a first value associated with said first rotational direction and a second value associated with said second rotational direction.

4. The work apparatus of claim 1, wherein said value of said control variable periodically changes from one operating cycle ($B_n$) to the next operating cycle ($B_{n+1}$).

5. The work apparatus of claim 1, wherein said value of said control variable is randomly determined anew.

6. The work apparatus of claim 1 further comprising:
said electric circuit including an operating switch configured to be mechanically actuated for taking said electric motor into operation; and,
said control unit being configured to determine a new value of said control variable when said operating switch is actuated.

7. The work apparatus of claim 1, wherein said control unit includes a microprocessor which includes said memory unit.

8. The work apparatus of claim 1, wherein said memory unit is a volatile memory unit.

9. The work apparatus of claim 1, wherein said drive circuit is configured to start said electric motor in a predetermined one of said first and said second rotational directions when said memory unit has been purged and has an undefined memory content.

10. The work apparatus of claim 1 further comprising an energy source configured as a battery pack for the operation of said electric motor.

11. The work apparatus of claim 1, wherein said work apparatus is a hedge trimmer.

12. The work apparatus of claim 1, wherein said control unit autonomously determines said control value determinative for the operation of said electric motor in one or the other of said first and second rotational directions.

13. A handheld work apparatus comprising:
a work tool;
a gear mechanism;
an electric motor configured to generate a rotational movement and to drive said work tool via said gear mechanism;
said gear mechanism being configured to convert said rotational movement of said electric motor into an oscillating movement of said work tool;
an electric circuit including said electric motor and a switch unit for operating said electric motor in a first rotational direction;
said electric circuit further including a drive circuit for said electric motor;
said drive circuit including a control unit configured for operating said electric motor in said first rotational direction or in a second rotational direction;
a memory unit configured to store a value of a control variable;
said control unit being further configured to autonomously determine a selected one of said rotational directions of said electric motor for a next operating cycle ($B_n$) in dependence upon said control variable and independent of any control command of a user of said work apparatus;
when said electric motor is started, said electric motor is started in the rotational direction corresponding to the actual value of said control variable;
the value of said control variable being autonomously newly determined for a follow-on operating cycle ($B_{n+x}$) independent of any control command of a user;
said drive circuit being configured to determine a new value of said control variable in dependence upon a comparison of a run time ($t_R$) of said electric motor in said first rotational direction and a run time ($t_L$) of said electric motor in said second rotational direction;
a first summing element configured to add said run time ($t_R$) of said electric motor in said first rotational direction and to output a first output signal;
a second summing element configured to add said run time ($t_L$) of said electric motor in said second rotational direction and to output a second output signal; and,
a comparator configured to compare said first output signal and said second output signal and to output the new value of said control variable.

14. A handheld work apparatus comprising:
a work tool;
a gear mechanism;
an electric motor configured to generate a rotational movement and to drive said work tool via said gear mechanism;
said gear mechanism being configured to convert said rotational movement of said electric motor into an oscillating movement of said work tool;
an electric circuit including said electric motor and a switch unit for operating said electric motor in a first rotational direction;

said electric circuit further including a drive circuit for said electric motor;

said drive circuit including a control unit configured for operating said electric motor in said first rotational direction or in a second rotational direction;

a memory unit configured to store a value of a control variable;

said control unit being further configured to autonomously determine a selected one of said rotational directions of said electric motor for a next operating cycle ($B_n$) in dependence upon said control variable and independent of any control command of a user of said work apparatus;

when said electric motor is started, said electric motor is started in the rotational direction corresponding to the actual value of said control variable;

the value of said control variable being autonomously newly determined for a follow-on operating cycle ($B_{n+x}$) independent of any control command of a user;

said drive circuit being configured to determine a new value of said control variable in dependence upon a comparison of the amount of power received by said electric motor in said first rotational direction and the amount of power received by said electric motor in said second rotational direction;

a first summing element configured to add the amount of power received by said electric motor in said first rotational direction and to output a first output signal;

a second summing element configured to add the amount of power received by said electric motor in said second rotational direction and to output a second output signal; and, a comparator configured to compare said first output signal and said second output signal and to output the new value of said control variable.

* * * * *

UNITED STATES PATENT AND TRADEMARK OFFICE
CERTIFICATE OF CORRECTION

PATENT NO. : 9,742,315 B2
APPLICATION NO. : 14/025729
DATED : August 22, 2017
INVENTOR(S) : J. Kloeker et al.

It is certified that error appears in the above-identified patent and that said Letters Patent is hereby corrected as shown below:

In the Specification

In Column 1:
Line 16: delete "one" and insert -- the -- therefor.
Line 50: delete "one" and insert -- the -- therefor.

In Column 2:
Line 56: delete "wish" and insert -- with -- therefor.
Line 58: delete "wish" and insert -- with -- therefor.

In Column 3:
Line 4: delete "year" and insert -- gear -- therefor.
Line 39: delete "one" and insert -- the -- therefor.
Line 46: delete "scarce" and insert -- source -- therefor.
Line 46: delete "fox" and insert -- for -- therefor.

In Column 4:
Line 56: delete "(25, 35; 26, 36; 27, 3)" and insert -- (25, 35; 26, 36; 27, 37) -- therefor.
Line 63: delete "swatches" and insert -- switches -- therefor.
Line 63: delete "(25, 25, 27, 35, 36, 37)" and insert -- (25, 26, 27, 35, 36, 37) -- therefor.

In Column 6:
Line 27: delete "mechanist" and insert -- mechanism -- therefor.

In Column 8:
Line 19: delete "one" and insert -- the -- therefor.
Line 23: delete "(25, 26, 27, 25, 36, 37)" and insert -- (25, 26, 27, 35, 36, 37) -- therefor.
Line 36: delete "(25, 26, 27, 35, 26, 37)" and insert -- (25, 26, 27, 35, 36, 37) -- therefor.
Line 39: delete "so" and insert -- to -- therefor.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*